(12) United States Patent
Chang

(10) Patent No.: US 8,643,776 B2
(45) Date of Patent: Feb. 4, 2014

(54) VIDEO PROCESSING METHOD CAPABLE OF PERFORMING PREDETERMINED DATA PROCESSING OPERATION UPON OUTPUT OF FRAME RATE CONVERSION WITH REDUCED STORAGE DEVICE BANDWIDTH USAGE AND RELATED VIDEO PROCESSING APPARATUS THEREOF

(75) Inventor: Te-Hao Chang, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 382 days.

(21) Appl. No.: 12/837,505

(22) Filed: Jul. 16, 2010

(65) Prior Publication Data
US 2011/0128439 A1    Jun. 2, 2011

Related U.S. Application Data

(60) Provisional application No. 61/264,953, filed on Nov. 30, 2009.

(51) Int. Cl.
*H04N 7/01*      (2006.01)

(52) U.S. Cl.
USPC ............................................. 348/441

(58) Field of Classification Search
USPC ................ 348/441, 448, 458, 459, 449, 455; 345/98, 204
See application file for complete search history.

(56) References Cited

U.S. PATENT DOCUMENTS

| 4,982,280 | A * | 1/1991 | Lyon et al. ................... 348/448 |
| 5,757,967 | A * | 5/1998 | Gonzales et al. ............. 382/233 |
| 6,151,075 | A * | 11/2000 | Shin et al. ..................... 348/459 |
| 6,362,834 | B2 * | 3/2002 | Ishii ............................... 345/690 |
| 6,975,359 | B2 * | 12/2005 | Jiang ............................. 348/348 |
| 7,336,317 | B2 * | 2/2008 | Yui et al. ....................... 348/459 |
| 7,548,276 | B2 * | 6/2009 | Mizuhashi et al. ........... 348/459 |
| 7,940,241 | B2 * | 5/2011 | Bae et al. ........................ 345/98 |
| 8,098,327 | B2 * | 1/2012 | Yamauchi ..................... 348/441 |
| 8,134,640 | B2 * | 3/2012 | Doswald ....................... 348/441 |

(Continued)

FOREIGN PATENT DOCUMENTS

| CN | 101494780 A | 7/2009 |
| WO | 2007034372 A2 | 3/2007 |
| WO | 2008027508 A2 | 3/2008 |
| WO | 2008146424 A1 | 12/2008 |

OTHER PUBLICATIONS

International application No. PCT/CN2010/076411, International filing date Aug. 27, 2010, "International Searching Report" mailing date: Dec. 2, 2010.

*Primary Examiner* — Paulos M Natnael
(74) *Attorney, Agent, or Firm* — Winston Hsu; Scott Margo

(57) ABSTRACT

An exemplary video processing method for processing a plurality of input frames includes storing the input frames successively, performing a frame rate conversion upon the successively stored input frames by utilizing a frame rate conversion circuit, and performing a predetermined data processing operation upon an output of the frame rate conversion. The step of performing the frame rate conversion includes generating and outputting a plurality of first output frames concurrently by referring to image data of at least one input frame. The step of performing the predetermined data processing operation includes receiving image data of the first output frames concurrently, wherein the first output frames contain image data of temporally adjacent output frames required by the predetermined data processing operation; and performing the predetermined data processing operation upon the image data of the concurrently received first output frames.

24 Claims, 6 Drawing Sheets

(56) References Cited

U.S. PATENT DOCUMENTS

| | | | |
|---|---|---|---|
| 8,144,778 B2* | 3/2012 | Jia et al. | 375/240.16 |
| 2004/0252756 A1* | 12/2004 | Smith et al. | 375/240.01 |
| 2007/0200838 A1* | 8/2007 | Lee et al. | 345/204 |
| 2008/0129862 A1* | 6/2008 | Hamada et al. | 348/441 |
| 2008/0239144 A1* | 10/2008 | Tanase et al. | 348/441 |
| 2009/0273707 A1* | 11/2009 | Miyoshi | 348/441 |
| 2010/0259675 A1* | 10/2010 | Kawai | 348/452 |
| 2011/0050862 A1* | 3/2011 | Cheng et al. | 348/51 |

\* cited by examiner

VIDEO PROCESSING METHOD CAPABLE OF PERFORMING PREDETERMINED DATA PROCESSING OPERATION UPON OUTPUT OF FRAME RATE CONVERSION WITH REDUCED STORAGE DEVICE BANDWIDTH USAGE AND RELATED VIDEO PROCESSING APPARATUS THEREOF

CROSS REFERENCE TO RELATED APPLICATIONS

This application claims the benefit of U.S. Provisional Application No. 61/264,953, filed on Nov. 30, 2009 and incorporated herein by reference.

BACKGROUND

The disclosed embodiments of the present invention relate to processing video data, and more particularly, to a video processing method capable of performing a predetermined data processing operation upon an output of a frame rate conversion with reduced storage device bandwidth usage and related video processing apparatus thereof.

Frame rate conversion (FRC) is a technique to convert a video input with a lower frame rate (e.g., 60 Hz) to a video output with a higher frame rate (e.g., 120 Hz or 240 Hz). Recently, FRC is frequently employed to reduce the motion blur of a liquid crystal display (LCD) panel. Because the LCD panel is a hold-type display panel, each frame will be displayed and held in one frame period. Due to the inherent characteristics of human eyes, the artifact, such as motion blur, will be perceived by the human eyes. The FRC technique is employed to enhance the frame rate (i.e., frames per second), and therefore provides an effective solution to the motion blur elimination. In addition, the electro-optic response time of the LCD panel is not fast enough for certain video applications. An overdrive technique is therefore proposed and applied to the LCD panel for artificially boosting the response time by increasing the driving voltage used to make a liquid crystal cell change its state.

Regarding the conventional FRC function, it requires frame buffer(s) to buffer image data of the successively transmitted frames. For example, taking a normal FRC operation which simply performs frame repetition for example, one frame read from a frame buffer is enough to generated repeated frame(s). Taking another FRC operation which performs motion estimation and motion compensation for example, at least two temporally adjacent frames are needed to generate the desired frames. Provided that a storage device (e.g., a dynamic random access memory) is employed to realize the frame buffer(s), the conventional FRC operation has to write each of the incoming input frames into the storage device and then read requested frame(s) from the same storage device.

Regarding the conventional overdrive function, it also requires one frame buffer to buffer each of the successively transmitted frames. For example, a previous frame read from the frame buffer is needed when a conventional overdrive processing circuit receives a current frame. Provided that a storage device (e.g., a dynamic random access memory) is employed to realize the frame buffer, the conventional overdrive operation has to write each of the incoming input frames into the storage device and then read one requested frame from the same storage device.

As mentioned above, both of the conventional overdrive operation and the conventional FRC operation require frame buffer(s) to successfully perform their functionality. In a case where the FRC function and the overdrive function are both used (e.g., the FRC function and the overdrive function are integrated in a single chip solution), the required memory bandwidth is quite high due to the fact that the FRC function and the overdrive function utilize the same memory device separately.

Therefore, there is a need to reduce the bandwidth usage of a storage device when both of the FRC function and the overdrive function are used.

SUMMARY

In accordance with exemplary embodiments of the present invention, a video processing method capable of performing a predetermined data processing operation upon an output of a frame rate conversion with reduced storage device bandwidth usage and related video processing apparatus thereof are proposed.

According to a first aspect of the present invention, an exemplary video processing method for processing a plurality of input frames is disclosed. The exemplary video processing method includes storing the input frames successively, performing a frame rate conversion upon the successively stored input frames by utilizing a frame rate conversion circuit, and performing a predetermined data processing operation upon an output of the frame rate conversion. The step of performing the frame rate conversion includes generating and outputting a plurality of first output frames concurrently by referring to image data of at least one input frame read from the storage device. The step of performing the frame rate conversion includes receiving image data of the first output frames concurrently, wherein the first output frames contain image data of temporally adjacent output frames required by the predetermined data processing operation; and performing the predetermined data processing operation upon the image data of the concurrently received first output frames.

According to a second aspect of the present invention, an exemplary video processing apparatus for processing a plurality of input frames is disclosed. The exemplary video processing apparatus includes a storage device, a frame rate conversion circuit, and a data processing circuit. The storage device stores the input frames successively. The frame rate conversion circuit is coupled to the storage device, and implemented for performing a frame rate conversion upon the successively stored input frames, wherein the frame rate conversion circuit generates and outputs a plurality of first output frames concurrently by referring to image data of at least one input frame read from the storage device. The data processing circuit is coupled to the frame rate conversion circuit, and implemented for performing a predetermined data processing operation upon an output of the frame rate conversion circuit. The data processing circuit receives image data of the first output frames concurrently, wherein the first output frames contain image data of temporally adjacent output frames required by the data processing circuit. In addition, the data processing circuit further performs the predetermined data processing operation upon the image data of the concurrently received first output frames.

According to a third aspect of the present invention, an exemplary video processing method for processing a plurality of input frames is disclosed. The exemplary video processing method includes storing the input frames successively, performing a frame rate conversion upon the successively stored input frames according to frame repetition by utilizing a frame rate conversion circuit, and performing a predetermined data processing operation upon an output of the frame rate conversion. The step of performing the frame rate conversion includes: generating and outputting a plurality of output frames; and generating and outputting an indication signal which indicates a predetermined data processing operation to obtain at least one duplicate of a first output frame included in the output frames and required by the predetermined data processing operation. The step of performing the predetermined data processing operation includes: receiving image data of the first output frame; and performing the predetermined data processing operation upon the image data of the received first output frame and image data of the at least one duplicate of the received first output frame according to the indication signal.

According to a fourth aspect of the present invention, an exemplary video processing apparatus for processing a plurality of input frames is disclosed. The exemplary video processing apparatus includes a storage device, a frame rate conversion circuit, and a data processing circuit. The storage device stores the input frames successively. The frame rate conversion circuit is coupled to the storage device, and implemented for performing a frame rate conversion upon the successively stored input frames according to frame repetition. The frame rate conversion circuit generates and outputs a plurality of output frames and an indication signal which indicates a predetermined data processing operation to obtain at least one duplicate of a first output frame included in the output frames and required by the predetermined data processing operation. The data processing circuit is coupled to the frame rate conversion circuit, and implemented for performing the predetermined data processing operation upon an output of the frame rate conversion. The data processing circuit receives image data of the first output frame, and performs the predetermined data processing operation upon the image data of the received first output frame and image data of at least one duplicate of the received first output frame according to the indication signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The conception of the present invention is to provide a frame rate conversion circuit which is capable of generating and outputting a plurality of output frames required by a following processing stage (e.g., an overdrive processing circuit) at the same time. In this way, the following processing stage does not need to store each output frame received from the frame rate conversion circuit into a storage device and then read the buffered frame from the storage device. Accordingly, the overall bandwidth usage of the storage device is reduced. Further details will be described as follows.

Figure 1:
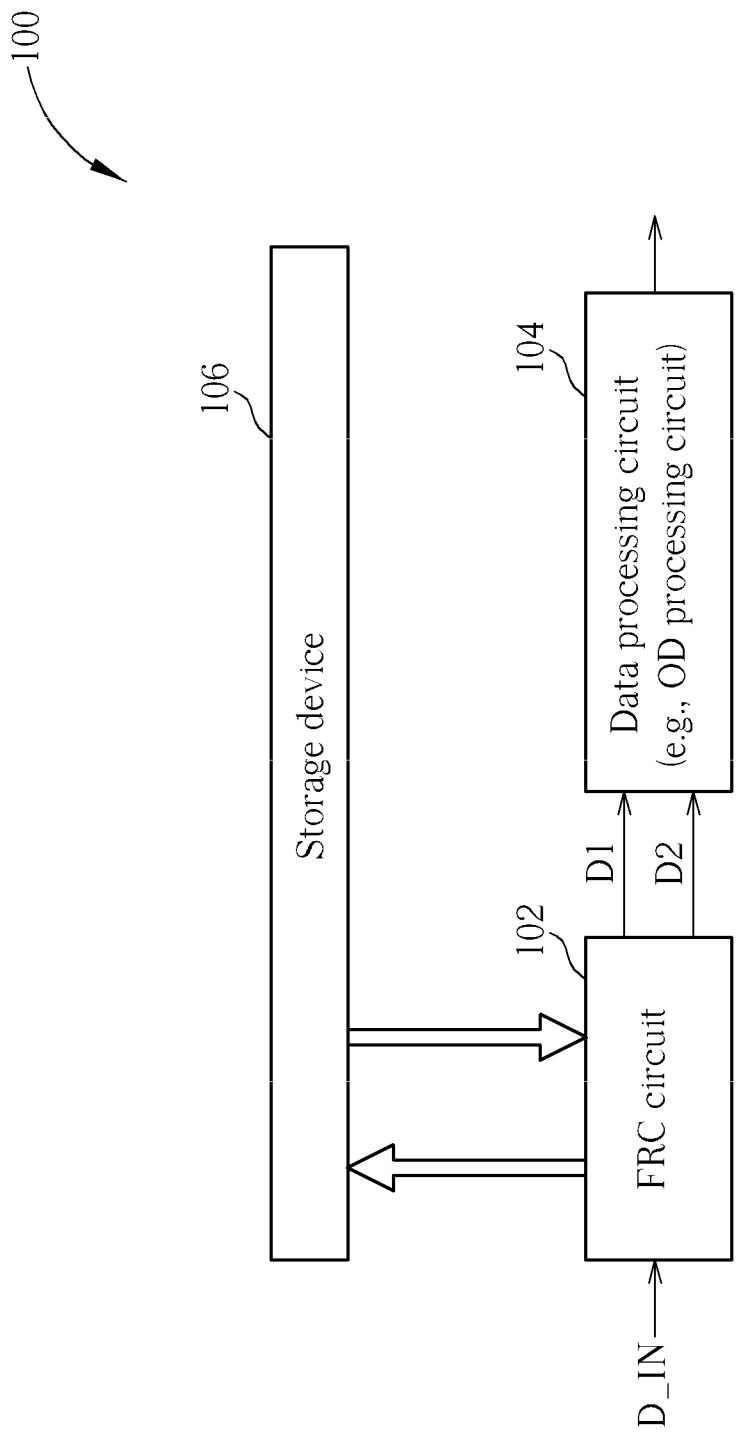
FIG. 1 is a block diagram illustrating a video processing apparatus according to a first exemplary embodiment of the present invention.

FIG. 1 is a block diagram illustrating a video processing apparatus according to a first exemplary embodiment of the present invention. The exemplary video processing apparatus 100 is utilized for processing a plurality of input frames transmitted via an input data stream D_IN, and includes, but is not limited to, a frame rate conversion (FRC) circuit 102, a data processing circuit 104, and a storage device 106. The input frames transmitted via the input data stream D_IN are successively stored into the storage device 106. For example, the input frames may be stored into the storage device 106 when received by the FRC circuit 102 or stored into the storage device 106 directly. In addition, the storage device 106 may be implemented by a dynamic random access memory (DRAM) having a storage space particularly allocated for serving as frame buffer(s) for buffering the input frames. The FRC circuit 102 is devised for performing a frame rate conversion upon the input frames with an original frame rate FR_IN to generate a desired output data stream D1 which transmits frames with a frame rate FR_1. By way of example, but not limitation, the frame rate FR_1 may be higher than the original frame rate FR_1 (i.e., FR_IN<FR_1). In this exemplary embodiment, the FRC circuit 102 is further arranged to generate an auxiliary output data stream D2 which transmits frames with a frame rate FR_2. For example, the frame rate FR_2 may be identical to the frame rate FR_1 (i.e., FR_1=FR_2). It should be noted that the FRC circuit 102 is capable of generating and outputting multiple frames at the same time. For example, the FRC circuit 102 may generate and output a plurality of output frames concurrently by referring to image data of a plurality of temporally adjacent input frames read from the storage device 106. The data processing circuit 104 is coupled to the frame rate conversion circuit 102, and implemented for performing a predetermined data processing operation upon an output of the FRC circuit 102. For example, the data processing circuit 104 receives image data of the output frames concurrently, and performs the predetermined data processing operation upon the image data of the concurrently received output frames. Please note that in the exemplary embodiment shown in FIG. 1, there is no data transaction between the storage device 106 and the data processing circuit 104. Upon reception of the output frames concurrently generated from the preceding FRC circuit 102, the data processing circuit 104 performs the predetermined data processing operation upon the image data of the concurrently received output frames directly. By way of example, but not limitation, the data processing circuit 104 may be an overdrive (OD) processing circuit utilized for determining overdrive voltages of pixels. In one exemplary implementation, the overdrive processing circuit may be simply realized by an overdrive look-up table (LUT). As the concurrently received output frames contain data of temporally adjacent output frames (e.g., a previous frame and a current frame) needed by the OD processing circuit, the OD processing circuit can directly determine the overdrive voltages of pixels in the current frame without accessing the storage device 106 upon receiving output frames concurrently generated from the preceding FRC circuit 102.

The FRC operation performed by the FRC circuit 102 shown in FIG. 1 is based on motion estimation (ME) and motion compensation (MC). Please refer to FIG. 2, which is a diagram illustrating the operation of the FRC circuit 102 which generates and outputs a plurality of output frames concurrently by referring to image data of a plurality of temporally adjacent input frames. The motion estimation is performed to find out motion vectors according to two temporally adjacent input frames 202_A and 202_B, and accordingly determines a motion vector (MV) plane. Two motion compensations refer to the same MV plane to generate output frames 204_A and 204_B, respectively. It should be noted that at least one of the output frames 204_A and 204_B is an interpolated frame between the temporally adjacent input frames 202_A and 202_B.

Figure 2:
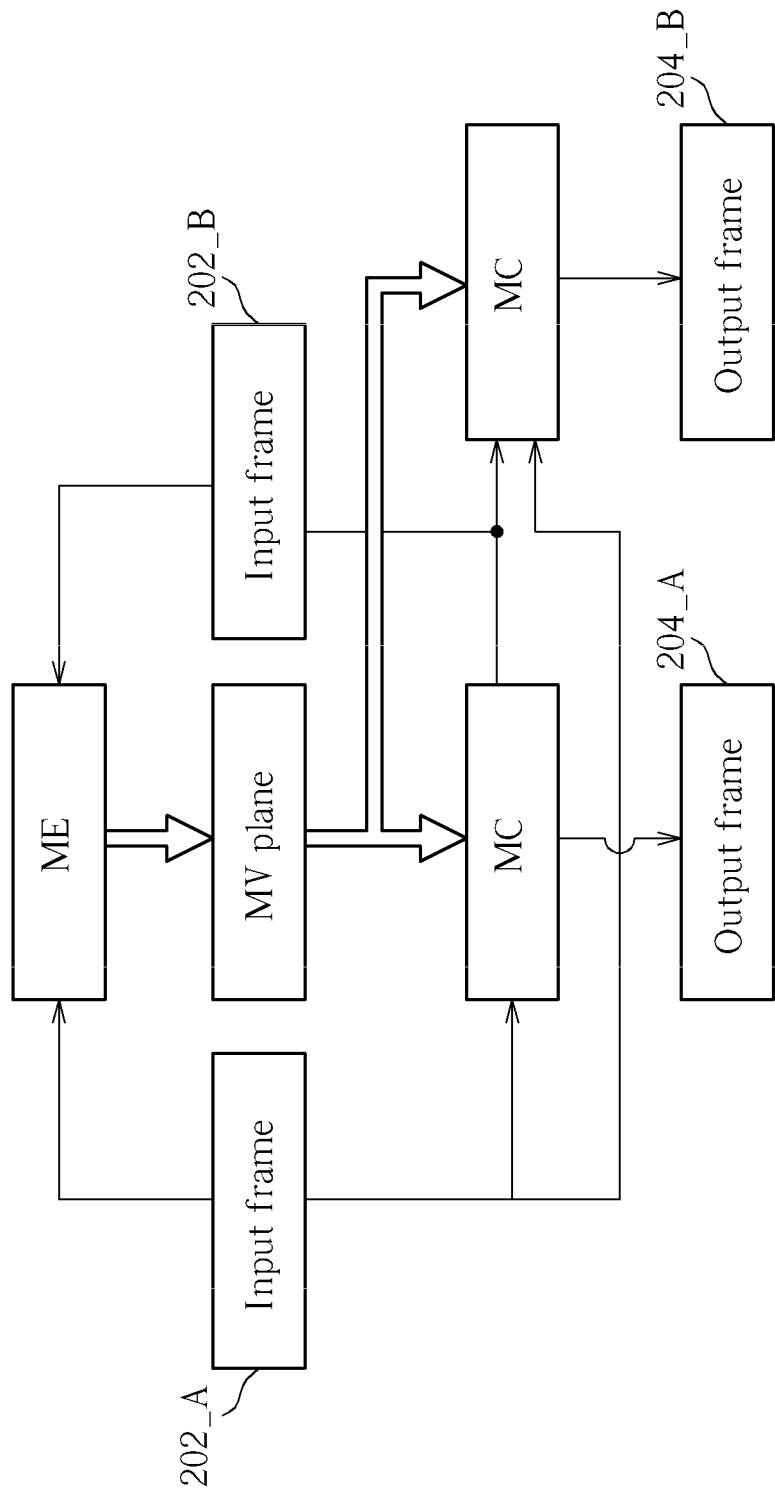
FIG. 2 is a diagram illustrating the operation of a frame rate conversion circuit which generates and outputs a plurality of output frames concurrently by referring to image data of a plurality of temporally adjacent input frames.
Figure 3:
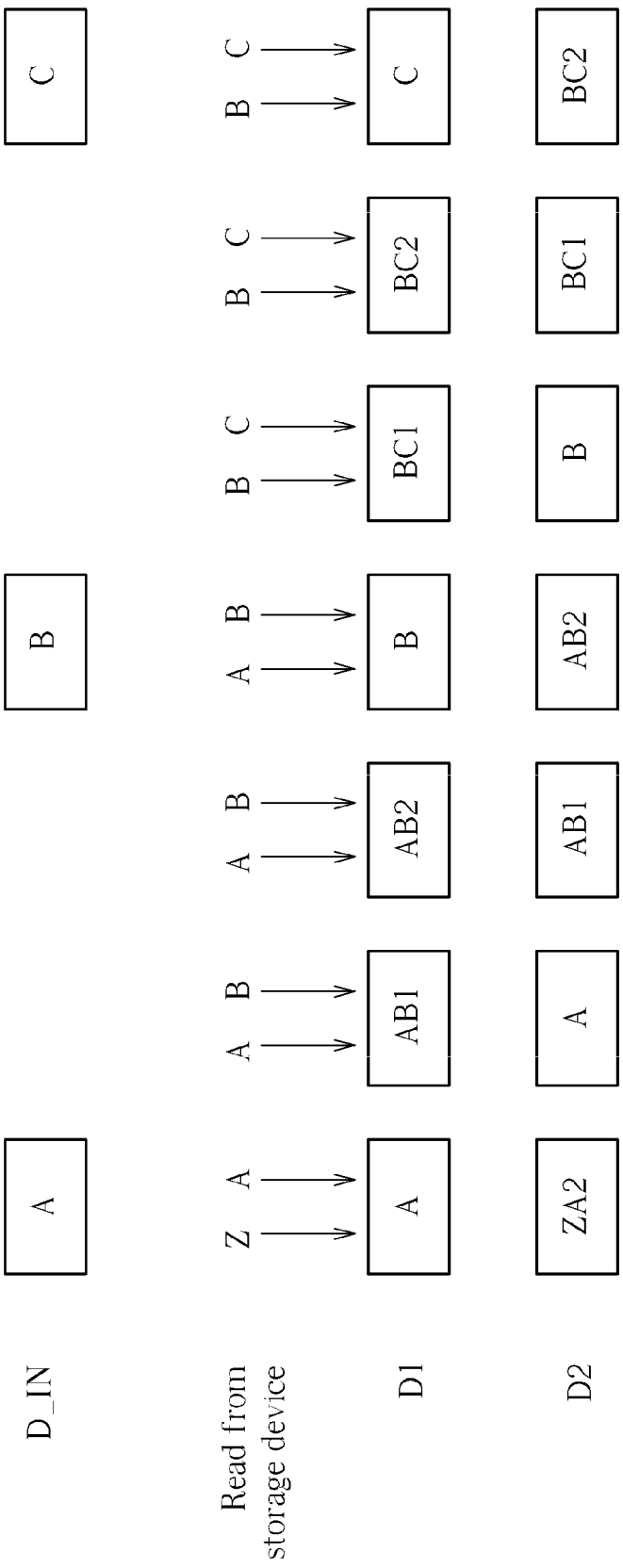
FIG. 3 is a diagram illustrating an exemplary output of the frame rate conversion circuit shown in FIG. 1.

FIG. 3 is a diagram illustrating an exemplary output of the FRC circuit 102 shown in FIG. 1. The FRC circuit 102 reads temporally adjacent input frames Z and A from the storage device 106, and then generates and outputs two output frames A and ZA2 concurrently through motion estimation and motion compensation as shown in FIG. 2. Next, the FRC circuit 102 reads temporally adjacent input frames A and B from the storage device 106, and then generates and outputs two output frames AB1 and A concurrently through motion estimation and motion compensation as shown in FIG. 2. With the same FRC methodology employed by the FRC circuit 102, the desired output data stream D1 includes successively transmitted output frames A, AB1, AB2, B, BC1, BC2, C, etc., and the auxiliary output data stream D2 includes successively transmitted output frames ZA2, A, AB1, AB2, B, BC1, BC2, etc. It should be noted that output frames Z, A, B, C, etc. are original frames transmitted via the input data stream D_IN, and the other output frames ZA2, AB1, AB2, BC1, BC2, etc. are interpolated frames generated due to ME and MC performed by the FRC circuit 102 upon the original frames transmitted via the input data stream D_IN. More specifically, the output frame ZA2 is an interpolated frame generated according to the original frames Z and A, the output frames AB1 and AB2 are different interpolated frames respectively generated according to the same original frames A and B, and the output frames BC1 and BC2 are different interpolated frames respectively generated according to the same original frames B and C.

As one can see from FIG. 3, an image data of one of the previous output frames concurrently generated by two temporally adjacent input frames is identical to an image data of one of the current output frames concurrently generated by two temporally adjacent input frames. For example, after the output frame A is generated and transmitted via the desired output data stream D1 to the following data processing circuit 104, the same output frame A is generated again and transmitted via the auxiliary data stream D2 to the following data processing circuit 104.

The concurrently generated output frames (e.g., AB2 and AB1) are temporally adjacent output frames (e.g., a current frame and a previous frame) required by the following data processing circuit (e.g., the OD processing circuit) 104. In other words, the desired output data stream D1 transmits current frames needed by the data processing circuit 104, and the auxiliary output data stream D2 transmits previous frames needed by the data processing circuit 104. As the FRC circuit 102 is capable of providing the data processing circuit 104 with all information needed to accomplish the predetermined data processing operation, the data processing circuit 104 therefore does not need to access the storage device 106, thereby reducing the bandwidth usage of the storage device 106.

Assume that the FRC circuit 102 performs the MEMC-based FRC upon the input frames with the original frame rate FR_IN of 60 Hz to generate frames with the frame rate FR_1 of 120 Hz. Regarding the conventional design, the FRC function requires one data write operation for storing an input frame into a storage device and two data read operations for reading temporally adjacent input frames from the storage device to generate an output frame, and the OD function requires one data write operation for storing a frame generated from the preceding FRC function into the storage device and one data read operation for reading the previously buffered frame from the storage device. Therefore, the storage device bandwidth usage of the FRC function can be expressed as: 1W (60 Hz)+2 R (120 Hz)=5×60 Hz, and the storage device bandwidth usage of the OD function can be expressed as: 1 W (120 Hz)+1 R (120 Hz)=4×60 Hz. Thus, the overall storage device bandwidth usage is equivalent to 9×60 Hz. Regarding the exemplary design of the present invention, the FRC function also requires one data write operation for storing an input frame into the storage device and two data read operations for reading temporally adjacent input frames from the storage device to generate an output frame, but the OD function requires neither data write operations nor data read operations. Therefore, the storage device bandwidth usage of the FRC function can be expressed as: 1 W (60 Hz)+2 R (120 Hz)=5×60 Hz, and the OD function has no storage device bandwidth usage. Thus, the overall bandwidth usage is equivalent to 5×60 Hz that is only 55.6% of the overall storage device bandwidth usage 9×60 Hz under the conventional design.

In above exemplary embodiment, the FRC circuit 102 always generates a plurality of output frames concurrently to the data processing circuit 104, regardless of the temporally adjacent input frames read from the storage device 106. However, this is for illustrative purposes only. In an alternative design, the FRC circuit 102 may be modified to generate first output frames concurrently by referring to image data of a plurality of temporally adjacent input frames and generates at least one second output frame by referring to image data of a plurality of temporally adjacent input frames, where a number of the first output frames is greater than a number of the at least one second output frame. Please refer to FIG. 4, which is a block diagram illustrating a video processing apparatus according to a second exemplary embodiment of the present invention. Similarly, the exemplary video processing apparatus 400 is utilized for processing input frames successively transmitted via the input data stream D_IN. In this exemplary embodiment, the video processing apparatus 400 includes, but is not limited to, an FRC circuit 402, a data processing circuit (e.g., an OD processing circuit) 404, and a storage device (e.g., a DRAM) 406. The input frames transmitted via the input data stream D_IN are successively stored into frame buffer(s) allocated in the storage device 406. For example, the input frames may be stored into the storage device 406 when received by the FRC circuit 402 or stored into the storage device 406 directly. The FRC circuit 402 performs the frame rate conversion upon the input frames with an original frame rate FR_IN to generate a desired output data stream D1 which transmits frames with a frame rate FR_1. By way of example, but not limitation, the frame rate FR_1 may be higher than the original frame rate FR_I (i.e., FR_IN<FR_1). In this exemplary embodiment, the FRC circuit 402 is further arranged to generate an auxiliary output data stream D2' which transmits frames with a frame rate FR_2. For example, the frame rate FR_2 may be lower than the frame rate FR_1 (i.e., FR_2<FR_1). More specifically, the FRC circuit 402 is capable of generating and outputting multiple frames at the same time, but the FRC circuit 402 does not always generate and output multiple frames concurrently. Therefore, the data processing circuit 404 may need to store a frame generated from the preceding FRC circuit 402 into the storage device 406 and then read the previously buffered frame from the storage device 406. In other words, if the FRC circuit 402 directly provides the data processing circuit 404 with all information needed to accomplish the predetermined data processing operation, the data processing circuit 404 does not need to read any needed information from the storage device 406, and if the FRC circuit 402 only provides the data processing circuit 404 with part of the information needed to accomplish the predetermined data processing operation, the data processing circuit 404 needs to read the remaining part of the needed information from the storage device 406.

Figure 4:
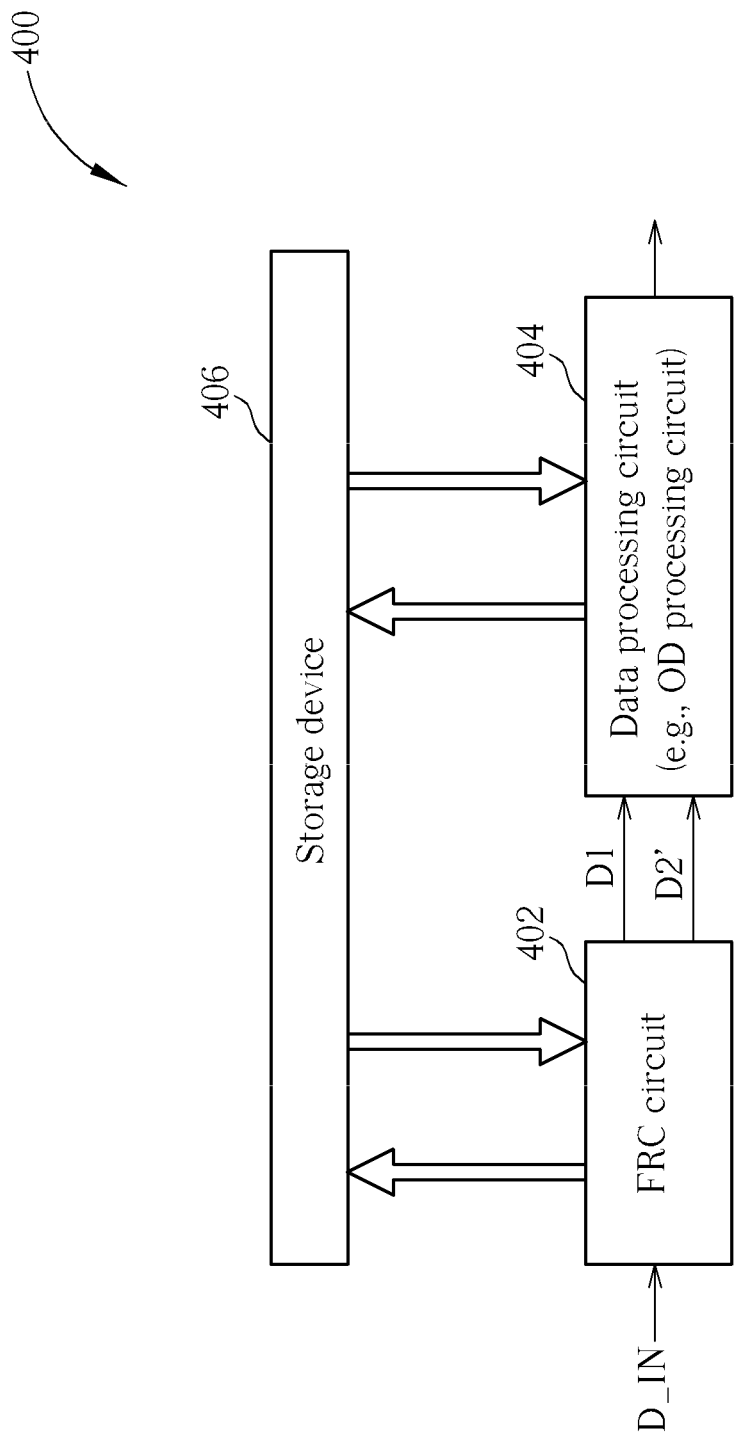
FIG. 4 is a block diagram illustrating a video processing apparatus according to a second exemplary embodiment of the present invention.
Figure 5:
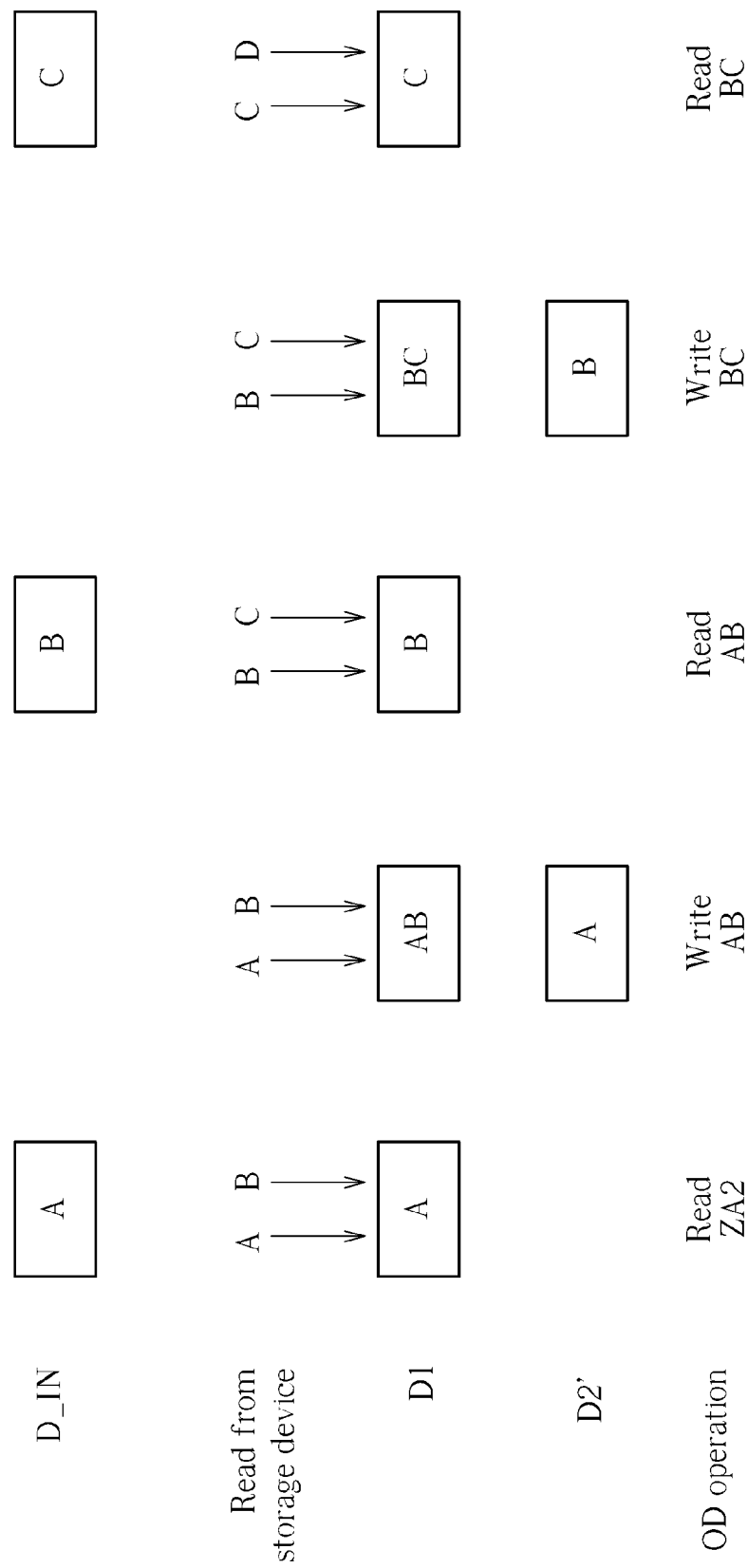
FIG. 5 is a diagram illustrating an exemplary output of a frame rate conversion circuit shown in FIG. 4.

FIG. 5 is a diagram illustrating one exemplary output of the FRC circuit 402 shown in FIG. 4. In one exemplary embodiment, the FRC circuit 402 is implemented by an MEMC-based FRC circuit. As shown in FIG. 5, the FRC circuit 402 therefore reads temporally adjacent input frames A and B from the storage device 106, and then generates and outputs one output frame A through motion estimation and motion compensation. That is, the frame A is generated according to the normal MEMC-based FRC operation which outputs a single frame according to two temporally adjacent input frames read from the storage device 406. Next, the FRC circuit 402 reads temporally adjacent input frames A and B from the storage device 106, and then generates and outputs two output frames AB and A concurrently by motion estimation and motion compensation as shown in FIG. 2. Accordingly, the desired output data stream D1 includes successively transmitted output frames A, AB, B, BC, C, etc., and the auxiliary output data stream D2' includes successively transmitted output frames A, B, etc. It should be noted that output frames A, B, C, D, etc. are original frames transmitted via the input data stream D_N, and the other output frames AB, BC, etc. are interpolated frames generated due to ME and MC performed by the FRC circuit 402 upon the original frames transmitted via the input data stream D_IN. More specifically, the output frame AB is an interpolated frame generated according to the original frames A and B, and the output frame BC is an interpolated frame generated according to the original frames B and C.

As one can see from FIG. 5, the frame rate of the output frames transmitted by the desired output data stream D1 is higher than that of the output frames transmitted by the auxiliary output data stream D2'. In a case where the data processing circuit 404 is an OD processing circuit, the auxiliary output data stream D2' does not always provide the previous frames needed by the OD function. For example, when the generated output frame A acting as a current frame is transmitted to the data processing circuit 404 via the desired output data stream D1, a previous output frame ZA2 is not simultaneously transmitted to the data processing circuit 404 via the auxiliary output data stream D2'. Therefore, the data processing circuit 404 is configured to store the output frame ZA2, previously generated by the FRC circuit 402 and transmitted via the desired output data stream D1, into the storage device 406, and then read the buffered output frame ZA2 (i.e., the previous frame) from the storage device 406 when receiving the output frame A (i.e., the current frame) transmitted via the desired output data stream D1. Similarly, the data processing circuit 404 stores the output frame AB, generated by the FRC circuit 402 and transmitted via the desired output data stream D1, into the storage device 406, and then reads the buffered output frame AB (i.e., the previous frame) from the storage device 406 when receiving the output frame B (i.e., the current frame) transmitted via the desired output data stream D1. As mentioned above, the OD function requires a current frame and a previous frame. Therefore, the data processing circuit 404 directly receives the current frames via the desired output data stream D1, and obtains the previous frames from the auxiliary output data stream D2' or the storage device 406. As can be seen from FIG. 5, an image data of one of the output frames concurrently generated by two temporally adjacent input frames may be identical to an image data of one output frame previously generated by two temporally adjacent input frames. For example, after the output frame A is generated and transmitted via the desired output data stream D1 to the following data processing circuit 404, the same output frame A is generated again and transmitted via the auxiliary data stream D2 to the following data processing circuit 404. It should be noted that not all of the previous frames are stored into the storage device 406 and then read from the storage device 406. Thus, the same objective of reducing the storage device bandwidth usage is achieved.

The same conception employed by the video processing apparatus 400 with the MEMC-based FRC circuit 402 may be applied to the video processing apparatus 400 with the normal FRC circuit 402 which accomplishes the FRC operation by frame repetition instead of motion estimation and motion compensation. Details of such an alternative design is described as follows.

In the alternative design of having the FRC circuit 402 implemented for performing the FRC operation by frame repetition, the FRC circuit 402 is modified to generate one output data stream (e.g., D1 shown in FIG. 4) by referring to an image data of a single input frame and further generate one indication signal (e.g., D2' shown in FIG. 4) which indicates the data processing circuit 404 to obtain at least one duplicate of an output frame included in the output frames and required by a predetermined data processing operation performed by the data processing circuit 404. To put it simply, in this exemplary embodiment, the indication signal D2' is to indicate that certain output frames (e.g., current frames) included in the output data stream D1 should be duplicated/repeated to form other frames (e.g., previous frames) also required by the data processing circuit 404. Thus, upon notified by the indication signal D2', the data processing circuit 404 performs the predetermined data processing operation upon image data of a currently received output frame and image data of at least one duplicate of the currently received output frame.

The input frames transmitted via the input data stream D_N are stored into the storage device 406. By way of example, but not limitation, the input frames may be stored into the storage device 406 when received by the FRC circuit 402 or stored into the storage device 406 directly. The FRC circuit 402 performs the frame rate conversion (i.e., frame repetition) according to the input frames with an original frame rate FR_IN to thereby generate a desired output data stream D1 which transmits frames with a frame rate FR_1. For example, the frame rate FR_1 may be higher than the original frame rate FR_I (i.e., FR_IN<FR_1). Moreover, in this alternative design, the FRC circuit 402 is further arranged to generate an indication signal D2' to inform the data processing circuit 404 of a current output frame included in the output data stream D1 that should be duplicated to obtain at least one frame also required by the data processing circuit 404. As the FRC circuit 402 does not always generate and output multiple needed frames concurrently, the data processing circuit 404 may derive a needed frame by simple frame duplication/repetition, or may need to store a frame generated from the preceding FRC circuit 402 into the storage device 406 and then read the previously buffered frame from the storage device 406 to serve as the needed frame.

Figure 6:
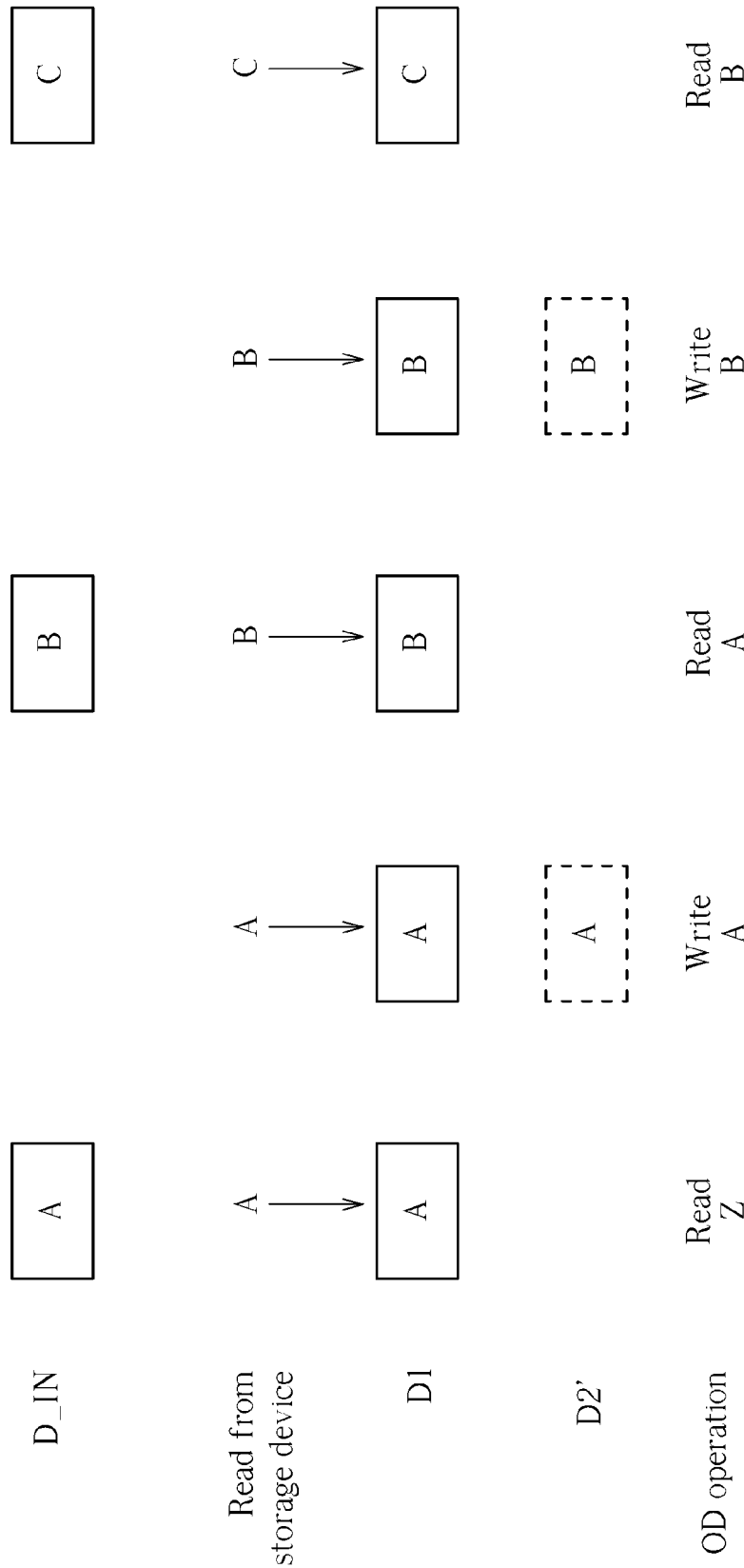
FIG. 6 is a diagram illustrating another exemplary output of the frame rate conversion circuit shown in FIG. 4.

FIG. 6 is a diagram illustrating another exemplary output of the FRC circuit 402 shown in FIG. 4. As shown in the figure, the FRC circuit 402 reads one input frame A from the storage device 106, and then generates and outputs one output frame A through frame repetition, where the accompanying indication signal D2' does not indicate that any frame also needed by the data processing circuit 404 should be derived from a duplicate of the current output frame A. Next, the FRC circuit 402 reads the same input frame A from the storage device 106, and then generates and outputs the output frame A through frame repetition, where the accompanying indication signal D2' indicates that the current output frame A is identical to any frame also needed by the data processing circuit 404. In other words, the indication signal D2' indicates that any frame also needed by the data processing circuit 404 should be derived from a duplicate of the current output frame A. Accordingly, the desired output data stream D1 includes successively transmitted output frames A, A, B, B, C, etc., and the indication signal D2' properly indicates which output frame transmitted by the output data stream D1 should be duplicated to generate at least one frame also needed by the data processing circuit 404. In a case where the data processing circuit 404 is an OD processing circuit, the indication signal D2' indicates that a pervious frame needed by the OD function can be directly derived from a duplicate of a current frame received from the output data stream D1. Thus, upon reception of the current frame generated by the frame rate conversion circuit 402, the OD processing circuit may directly process the image data of the received current frame and the image data of a duplicate of the received current frame (i.e., the image data of a previous frame needed by the OD function). However, if the indication signal D2' does not indicate that a pervious frame needed by the OD function can be directly derived from a duplicate of a current frame received from the output data stream D1, the needed previous frame may be derived from a previously stored output frame.

For example, when the generated output frame A acting as a current frame is transmitted to the data processing circuit 404 via the desired output data stream D1, a previous output frame Z is read from the storage device 406 to act as a previous frame. That is, the data processing circuit 404 is configured to store the output frame Z, previously generated by the FRC circuit 402 and transmitted via the desired output data stream D1 and further indicated by the indication signal D2' to be identical to at least one frame also needed by the OD processing circuit, into the storage device 406, and then read the buffered output frame Z (i.e., the previous frame) from the storage device 406 when receiving the output frame A (i.e., the current frame) transmitted via the desired output data stream D1. Similarly, the data processing circuit 404 stores the output frame A, generated by the FRC circuit 402 and transmitted via the desired output data stream D1 and further indicated by the indication signal D2' to be identical to at least one frame also needed by the OD processing circuit, into the storage device 406, and then reads the buffered output frame A (i.e., the previous frame) from the storage device 406 when receiving the output frame B (i.e., the current frame) transmitted via the desired output data stream D1.

Briefly summarized, in the aforementioned alternative design, the data processing circuit 404 directly receives the current frames via the desired output data stream D1, and obtains the previous frames from duplicates of the current frames or buffered frames in the storage device 406. Moreover, as can be seen from FIG. 6, not all of the previous frames are stored into the storage device 406 and then read from the storage device 406. Thus, reducing the storage device bandwidth usage is also achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing method for processing a plurality of input frames, comprising:
   storing the input frames successively;
   performing a frame rate conversion upon the successively stored input frames by utilizing a frame rate conversion circuit, comprising:
      generating and outputting a plurality of first output frames concurrently by referring to image data of at least one input frame; and
   performing a predetermined data processing operation upon an output of the frame rate conversion, comprising:
      receiving image data of the first output frames concurrently, wherein the first output frames contain image data of temporally adjacent output frames required by the predetermined data processing operation, and image data of one of the first output frames generated and outputted in a current frame rate conversion performed by the frame rate conversion circuit is also generated and outputted in a previous frame rate conversion performed by the frame rate conversion circuit; and
      performing the predetermined data processing operation upon the image data of the concurrently received first output frames.

2. The video processing method of claim 1, wherein the step of performing the predetermined data processing operation upon the image data of the concurrently received first output frames comprises:
   upon reception of the first output frames concurrently generated by the frame rate conversion circuit, directly performing the predetermined data processing operation upon the image data of the concurrently received first output frames.

3. The video processing method of claim 1, wherein the predetermined data processing operation is an overdrive processing operation utilized for determining overdrive voltages of pixels.

4. A video processing method for processing a plurality of input frames, comprising:
   storing the input frames successively;
   performing a frame rate conversion upon the successively stored input frames by utilizing a frame rate conversion circuit, comprising:
      generating and outputting a plurality of first output frames concurrently by referring to image data of at least one input frame; and
   performing a predetermined data processing operation upon an output of the frame rate conversion, comprising:
      receiving image data of the first output frames concurrently, wherein the first output frames contain image data of temporally adjacent output frames required by the predetermined data processing operation; and performing the predetermined data processing operation upon the image data of the concurrently received first output frames;

wherein:

the step of generating and outputting the first output frames concurrently comprises:

generating and outputting the first output frames concurrently by referring to image data of a plurality of temporally adjacent input frames;

the step of performing the frame rate conversion upon the successively stored input frames further comprises:

generating and outputting a plurality of second output frames concurrently by referring to image data of a plurality of temporally adjacent input frames, wherein a number of the first output frames is equal to a number of the second output frames, and an image data of one of the first output frames is identical to an image data of one of the second output frames.

5. A video processing method for processing a plurality of input frames, comprising:

storing the input frames successively;

performing a frame rate conversion upon the successively stored input frames by utilizing a frame rate conversion circuit, comprising:

generating and outputting a plurality of first output frames concurrently by referring to image data of at least one input frame; and performing a predetermined data processing operation upon an output of the frame rate conversion, comprising:

receiving image data of the first output frames concurrently, wherein the first output frames contain image data of temporally adjacent output frames required by the predetermined data processing operation; and performing the predetermined data processing operation upon the image data of the concurrently received first output frames; wherein:

the step of generating and outputting the first output frames concurrently comprises:

generating and outputting the first output frames concurrently by referring to image data of a plurality of temporally adjacent input frames;

the step of performing the frame rate conversion upon the successively stored input frames further comprises:

generating and outputting at least one second output frame by referring to image data of a plurality of temporally adjacent input frames, wherein a number of the first output frames is greater than a number of the at least one second output frame.

6. The video processing method of claim 5, wherein an image data of one of the first output frames is identical to an image data of one of the at least one second output frame.

7. The video processing method of claim 5, wherein the step of performing the predetermined data processing operation upon the output of the frame rate conversion further comprises:

storing image data of at least one first output frame of the concurrently received first output frames;

receiving image data of the at least one second output frame, and reading the image data of the at least one stored first output frame; and performing the predetermined data processing operation upon the image data of the at least one second output frame and the image data of the at least one stored first output frame.

8. A video processing apparatus for processing a plurality of input frames, comprising:

a storage device, storing the input frames successively; and a frame rate conversion circuit, coupled to the storage device, for performing a frame rate conversion upon the successively stored input frames, wherein the frame rate conversion circuit generates and outputs a plurality of first output frames concurrently by referring to image data of at least one input frame read from the storage device; and a data processing circuit, coupled to the frame rate conversion circuit, for performing a predetermined data processing operation upon an output of the frame rate conversion circuit, wherein the data processing circuit receives image data of the first output frames concurrently, the first output frames contain image data of temporally adjacent output frames required by the data processing circuit, image data of one of the first output frames generated and outputted in a current frame rate conversion performed by the frame rate conversion circuit is also generated and outputted in a previous frame rate conversion performed by the frame rate conversion circuit, and the data processing circuit further performs the predetermined data processing operation upon the image data of the concurrently received first output frames.

9. The video processing apparatus of claim 8, wherein upon reception of the first output frames concurrently generated by the frame rate conversion circuit, the data processing circuit performs the predetermined data processing operation upon the image data of the concurrently received first output frames, directly.

10. The video processing apparatus of claim 8, wherein the data processing circuit is an overdrive processing circuit utilized for determining overdrive voltages of pixels.

11. A video processing apparatus for processing a plurality of input frames, comprising:

a storage device, storing the input frames successively; and a frame rate conversion circuit, coupled to the storage device, for performing a frame rate conversion upon the successively stored input frames, wherein the frame rate conversion circuit generates and outputs a plurality of first output frames concurrently by referring to image data of at least one input frame read from the storage device; and a data processing circuit, coupled to the frame rate conversion circuit, for performing a predetermined data processing operation upon an output of the frame rate conversion circuit, wherein the data processing circuit receives image data of the first output frames concurrently, the first output frames contain image data of temporally adjacent output frames required by the data processing circuit, and the data processing circuit further performs the predetermined data processing operation upon the image data of the concurrently received first output frames;

wherein the frame rate conversion circuit generates and outputs the first output frames concurrently by referring to image data of a plurality of temporally adjacent input frames, and further generates and outputs a plurality of second output frames concurrently by referring to image data of a plurality of temporally adjacent input frames, wherein a number of the first output frames is equal to a number of the second output frames, and an image data of one of the first output frames is identical to an image data of one of the second output frames.

12. A video processing apparatus for processing a plurality of input frames, comprising:
   a storage device, storing the input frames successively; and
   a frame rate conversion circuit, coupled to the storage device, for performing a frame rate conversion upon the successively stored input frames, wherein the frame rate conversion circuit generates and outputs a plurality of first output frames concurrently by referring to image data of at least one input frame read from the storage device; and
   a data processing circuit, coupled to the frame rate conversion circuit, for performing a predetermined data processing operation upon an output of the frame rate conversion circuit, wherein the data processing circuit receives image data of the first output frames concurrently, the first output frames contain image data of temporally adjacent output frames required by the data processing circuit, and the data processing circuit further performs the predetermined data processing operation upon the image data of the concurrently received first output frames;
   wherein the frame rate conversion circuit generates and outputs the first output frames concurrently by referring to image data of a plurality of temporally adjacent input frames, and further generates and outputs at least one second output frame by referring to image data of a plurality of temporally adjacent input frames, wherein a number of the first output frames is greater than a number of the at least one second output frame.

13. The video processing apparatus of claim 12, wherein an image data of one of the first output frames is identical to an image data of one of the at least one second output frame.

14. The video processing apparatus of claim 12, wherein the data processing circuit further stores image data of at least one first output frame of the concurrently received first output frames into the storage device; receives image data of the at least one second output frame and reads the image data of the at least one first output frame stored in the storage device; and performs the predetermined data processing operation upon the image data of the at least one second output frame generated from the frame rate conversion and the image data of the at least one first output frame read from the storage device.

15. A video processing method for processing a plurality of input frames, comprising:
   storing the input frames successively;
   performing a frame rate conversion upon the successively stored input frames according to frame repetition by utilizing a frame rate conversion circuit, comprising:
      generating and outputting a plurality of output frames; and
      generating and outputting an indication signal which indicates a predetermined data processing operation to obtain at least one duplicate of a first output frame included in the output frames and required by the predetermined data processing operation; and
   performing the predetermined data processing operation upon an output of the frame rate conversion, comprising:
      receiving image data of the first output frame; and
      performing the predetermined data processing operation upon the image data of the received first output frame and image data of the at least one duplicate of the received first output frame according to the indication signal.

16. The video processing method of claim 15, wherein the step of performing the predetermined data processing operation upon the image data of the received first output frame and the image data of the at least one duplicate of the received first output frame comprises:
   upon reception of the first output frame generated by the frame rate conversion circuit, directly performing the predetermined data processing operation upon the image data of the received first output frame and the image data of the at least one duplicate of the received first output frame.

17. The video processing method of claim 15, wherein the predetermined data processing operation is an overdrive processing operation utilized for determining overdrive voltages of pixels.

18. The video processing method of claim 15, wherein the step of performing the predetermined data processing operation further comprises:
   storing the image data of the received first output frame;
   receiving image data of a second output frame included in the output frames and reading the image data of the stored first output frame; and
   performing the predetermined data processing operation upon the image data of the second output frame and the image data of the stored first output frame.

19. A video processing apparatus for processing a plurality of input frames, comprising:
   a storage device, storing the input frames successively;
   a frame rate conversion circuit, coupled to the storage device, for performing a frame rate conversion upon the successively stored input frames according to frame repetition, wherein the frame rate conversion circuit generates and outputs a plurality of output frames and an indication signal which indicates a predetermined data processing operation to obtain at least one duplicate of a first output frame included in the output frames and required by the predetermined data processing operation; and
   a data processing circuit, coupled to the frame rate conversion circuit, for performing the predetermined data processing operation upon an output of the frame rate conversion, wherein the data processing circuit receives image data of the first output frame, and performs the predetermined data processing operation upon the image data of the received first output frame and image data of the at least one duplicate of the received first output frame according to the indication signal.

20. The video processing apparatus of claim 19, wherein upon reception of the first output frame generated by the frame rate conversion circuit, the data processing circuit performs the predetermined data processing operation upon the image data of the received first output frame and the image data of the at least one duplicate of the received first output frame, directly.

21. The video processing apparatus of claim 19, wherein the data processing circuit is an overdrive processing circuit utilized for determining overdrive voltages of pixels.

22. The video processing apparatus of claim 19, wherein the data processing circuit further stores the image data of the received first output frame into the storage device; receives image data of a second output frame included in the output frames and reads the image data of the stored first output frame; and performs the predetermined data processing operation upon the image data of the second output frame and the image data of the stored first output frame.

23. A video processing method for processing a plurality of input frames, comprising:
   storing the input frames successively;

performing a frame rate conversion upon the successively stored input frames by utilizing a frame rate conversion circuit, comprising:
    generating and outputting a plurality of first output frames concurrently by referring to image data of a plurality of temporally adjacent input frames;
        wherein motion estimation is performed by the frame rate conversion circuit to find out motion vectors according to the temporally adjacent input frames, and accordingly determines a motion vector plane; and the same motion vector plane is used by the frame rate conversion circuit to generate each of the first output frames; and
performing a predetermined data processing operation upon an output of the frame rate conversion, comprising:
    receiving image data of the first output frames concurrently, wherein the first output frames contain image data of temporally adjacent output frames required by the predetermined data processing operation; and
    performing the predetermined data processing operation upon the image data of the concurrently received first output frames.

24. A video processing apparatus for processing a plurality of input frames, comprising:
    a storage device, storing the input frames successively; and
    a frame rate conversion circuit, coupled to the storage device, for performing a frame rate conversion upon the successively stored input frames; wherein the frame rate conversion circuit generates and outputs a plurality of first output frames concurrently by referring to image data of a plurality of temporally adjacent input frames read from the storage device; motion estimation is performed by the frame rate conversion circuit to find out motion vectors according to the temporally adjacent input frames, and accordingly determines a motion vector plane; and the same motion vector plane is used by the frame rate conversion circuit to generate each of the first output frames; and
    a data processing circuit, coupled to the frame rate conversion circuit, for performing a predetermined data processing operation upon an output of the frame rate conversion circuit, wherein the data processing circuit receives image data of the first output frames concurrently, the first output frames contain image data of temporally adjacent output frames required by the data processing circuit, and the data processing circuit further performs the predetermined data processing operation upon the image data of the concurrently received first output frames.

\* \* \* \* \*